United States Patent [19]
Shorr

[11] 3,877,919
[45] Apr. 15, 1975

[54] TRACTION ROLLS FOR USE IN GLASS MAKING

[75] Inventor: Norman Shorr, Pittsburgh, Pa.

[73] Assignee: PPG Industries, Inc., Pittsburgh, Pa.

[22] Filed: Sept. 26, 1973

[21] Appl. No.: 401,101

[52] U.S. Cl. .................. 65/194; 29/132; 65/245; 65/253; 65/374
[51] Int. Cl. .................. C03b 13/16; C03b 15/04
[58] Field of Search .......... 65/374, 245, 182 R, 253, 65/194; 29/132

[56] References Cited
UNITED STATES PATENTS

| | | | |
|---|---|---|---|
| 3,164,643 | 1/1965 | Hubbard | 29/132 |
| 3,404,973 | 10/1968 | Nedelec | 65/374 X |
| 3,593,398 | 7/1971 | Hess | 29/132 |
| 3,662,446 | 5/1972 | Walls | 29/132 |
| 3,763,533 | 10/1973 | Blom et al. | 65/374 X |

FOREIGN PATENTS OR APPLICATIONS

| | | | |
|---|---|---|---|
| 1,931,802 | 6/1969 | Germany | 65/374 |

Primary Examiner—Arthur D. Kellogg
Attorney, Agent, or Firm—E. Kears Pollock; Donald Carl Lepiane

[57] ABSTRACT

Traction rolls, each having a refractory roll body and a dense, durable surface, are provided for use in supporting and handling flat glass, particularly at elevated temperatures, without marking the glass surfaces or causing flakes of roll material to be dispersed in the environment surrounding the rolls. Rolls having asbestos roll bodies are substantially safer for use when having such surfaces.

14 Claims, 7 Drawing Figures

TRACTION ROLLS FOR USE IN GLASS MAKING

BACKGROUND OF THE INVENTION

1. Field of the Invention

This invention relates to the making and handling of flat glass. More particularly, this invention relates to improved traction rolls for supporting flat glass at elevated temperatures, particularly immediately after forming molten glass into flat glass in sheet or ribbon form. This invention relates to a novel method of supporting, handling and/or recovering glass in sheet or ribbon form and to novel apparatus for performing such a process. It may be applied effectively to the so-called "Pennvernon" process of drawing sheet or window glass. A marked increase in glass quality is observed when it is applied in the proper way to the "Float" process of producing glass, a process wherein glass is deposited in molten state on a pool of molten metal, such as tin, and then is formed into a ribbon or is treated to improve the surface of a preformed ribbon by contact with molten tin. Pilkington U.S. Pat. No. 3,083,551 describes a typical float glass process. Several embodiments of this invention are especially applicable to supporting, handling and/or receiving glass while the glass is at a deformation temperature, i.e., a temperature at which it will deform or be subject to a marking deformation by contact with solid elements, generally about 900°F. and perhaps as high as 1,600°F. or above. However, the invention is applicable to supporting, handling and/or conveying glass at lower temperatures as well.

2. Description of the Prior Art

Supporting traction rolls are used in all common continuous flat glass making processes. In plate processes after a rough rolled ribbon of glass passes from the forming or casting rolls, it is conveyed along traction rolls. Since rough plate glass surfaces need not be carefully protected, traction rolls used in conveying rough plate glass have no critical surface characteristics.

In float processes, supporting traction rolls are used to lift a hot, continuous ribbon of glass from a float forming bath and convey the glass into and through an annealing lehr. Since float glass is formed with two smooth, "fire finish" surfaces, the supporting traction rolls must have surfaces which do not severely mark or damage the glass surfaces coming in contact with the rolls. U.S. Pat. No. 3,317,303 to Norman Shorr discloses the use of particular asbestos mixtures in the construction of such rolls. The rolls described in this patent may be effectively employed in apparatus for making sheet or window glass as well.

In sheet or window glass processes, such as the Pittsburgh or Pennvernon sheet glass process, the Fourcault process or the Colburn process, a continuous sheet or ribbon of glass is produced by drawing it directly out of a pool of molten glass. In such processes the glass has both surfaces smooth and "fire finished" and great care must be exercised to prevent damage to these surfaces, particularly while the glass is sufficiently hot to be deformable.

In the Pittsburgh or Pennvernon sheet glass drawing apparatus a series of pairs of rolls provide the tractive force required to draw glass upwardly from a bath of molten glass. In some installations, there are approximately 30 pairs of drawing rolls in a drawing machine, the majority of which contact the surfaces of the glass. The lowermost three or four sets of rolls generally engage the glass only at the start of the process or when the ribbon or sheet is initially being formed thereafter are held from engagement with the sheet because they would mar the hot glass surfaces by contact therewith. Typical drawing machines are illustrated by U.S. Pat. Nos. 1,598,730 and 2,215,231.

Rolls of the same type can also be used in the Fourcault sheet glass drawing apparatus, or in any apparatus for contacting hot glass where their properties might be useful or desirable. Typical rolls are illustrated in U.S. Pat. Nos. 1,930,999; 2,085,575; and 2,120,435.

The usual rolls used in the Pennvernon process are constructed of a plurality od discs assembled onto a steel mandrel and compressed thereon. They are clamped by collars under high pressure, as for example, 1,200 to 1,500 pounds per square inch. The collars being fixed under pressure maintain the discs under pressure. The assembled rolls are then lathe turned for trueness and surface finish.

The discs from which the rolls are made are cut from boards formed of a fiber-binder mix using asbestos. One widely used type of asbestos has been chrysotile asbestos. A chemical composition of chrysotile asbestos is $3MgO.2Si_2.2H_2O$. While chrysotile asbestos is the most common type of asbestos, it posseses certain drawbacks when used for rolls of the type being described, and especially those rolls subjected to elevated temperature, as for example, 1,000° to 1,200°F. and perhaps above. Temperatures of this magnitude are experienced by at least the lowermost sets of rolls of a drawing machine and are not uncommon in the entry portion of an annealing lehr. Generally, about one-third of the sets of the drawing rolls in the Pennvernon process are subjected to these elevated temperatures. More recently, rolls have been made of asbestos fibers, such as anthophyllite asbestos, amosite asbestos, tremolite asbestos, actinolite asbestos and mixtures thereof. Use of these materials is taught in U.S. Pat. No. 3,317,303. According to the teachings of this patent anthophyllite asbestos fiber is a preferred roll material.

While anthophyllite asbestos fiber is preferred, it is also possible to incorporate amosite, tremolite, and actinolite asbestos fibers or mixtures thereof, in lieu of all or a portion of anthophyllite asbestos fiber in roll discs. A chemical composition of anthophyllite asbestos is $7(MgO.FeO).8SiO_2.HO$; that of amosite asbestos is $(FeMg)SiO_3.H_2O$; that of tremolite is $Ca_2Mg5Si_8O_{22}(OH)_2$ and that of actinolite is $Ca(Mg.Fe)_3(SiO_3)_4.H_2O$. Such asbestos has an ignition loss, i.e., loss in weight of less than 5 percent preferably below 1.5 percent by weight when heated for 24 hours at 1,200°F.

Generally, it is preferred that the roll material contains 80 or more percent by weight of anthophyllite asbestos fiber or other asbestos fiber stated above based upon the total weight of asbestos fiber therein. Other fibers may also be present. Thus, crocidolite asbestos having a composition of $NaFe(SiO_3)_2FeSiO_3.H_2O$, and known as blue fiber, may be incorporated in a mixture of the specific asbestos fibers enumerated above.

Along with these asbestos materials it has been known from U.S. Pat. No. 3,515,531 to Norman Shorr and Hubertus W. V. Willems to prepare roll materials from the preferred asbestos materials, aluminum silicate and a binder, such as Portland cement.

These improved asbestos rolls of the prior art have been widely accepted by those skilled in flat glass manufacture for they effectually reduce the occurrence of surface marks caused by previous rolls. Further, these rolls have been noted for improved service life over chrysotile asbestos rolls which are degraded by $SO_2$ gas used in some processes in accordance with the teachings of U.S. Pat. No. 1,782,169.

Traction rolls comprising asbestos, whether of the older kind or the more recently improved kind, are subject to some flaking and dusting as individual asbestos fibers become broken. In a vertical sheet forming process, these particles or bits of asbestos can fall into the molten glass below the rolls and form defects in the glass formed therefrom. In the practice of any of the described processes, particles of asbestos may become air borne and must be removed from the air surrounding the rolls before it is discharged into the general atmosphere where its presence could be a potential health hazard.

The present invention provides traction rolls that are not subject to excessive flaking or dusting.

SUMMARY OF THE INVENTION

A traction roll for use in handling or supporting flat glass at elevated temperatures is made up of a conventional mandrel, generally of carbon steel, surrounded by a roll body of refractory material, generally as asbestos or a ceramic material, with a surface for engaging hot glass comprising a dense, durable material that is sufficiently cohesive to prevent the refractory roll body from flaking or dusting during use. The surface material may be a refractory material itself, such as aluminosilicate, or the refractory roll body may be coated with a dense, durable material such as a metal oxide, or the refractory roll body may have a dense, durable layer of heat resistant organic polymer disposed about it. In any event, the rolls of this invention are characterized by an outer surface layer of material that is more dense, less elastic and generally harder than the underlying roll body material or intermediate layer material immediately subjacent the surface layer. The heat resistant, organic materials that may be used are resistant to embrittlement, charring, degradation and creep at temperatures of at least about 500°F.

The roll body may be cast, extruded, laminated or the like. In the preferred embodiments of this invention the roll body is a laminate structure comprising a plurality of discs centered on a supporting mandrel and compressively held thereon by collars, one on each end of the roll. Preferably, a plurality of circular discs are cut from asbestos board, center cut and mounted on a mandrel.

The board is generally made by a wet mix process. Individual layers are laid down, one upon another, by successively depositing an asbestos or ceramic slurry containing a binder upon a screen and then upon the topmost deposited layer until a desired thickness is built up. The board is then dried under moderate pressure. A Fourdrinier machine may be used for this purpose.

Discs are cut or stamped from the board and are assembled onto a mandrel. After a sufficient number of discs are placed on the mandrel, they are pressed together under pressure on the order of about 1,200 pounds per square inch. This compresses the discs so that the roll or cylinder formed is about 95 percent the length of the uncompressed stack of discs. The roll is then lathe turned to produce a round roll. The surface of the roll appears smooth, without evidence of individual discs.

In one embodiment of this invention a roll having an asbestos or ceramic roll body is surrounded by a sleeve of hard, high-bulk density aluminosilicate. This roll presents a surface "skin" that is not abraded or punctured by cullet that occasionally falls in a drawing machine when a glass ribbon breaks. Yet the underlying asbestos is less dense than the aluminosilicate and provides sufficient elasticity to the roll so that under impact from cullet or the like, the roll absorbs the applied forces. This protects both the roll and the glass by minimizing pressure between them at pressure points. The rolls of this embodiment may comprise more than one layer of aluminosilicate. For example, an outer surface layer may be provided having a bulk density of the order of 50 pounds per cubic foot, and an under layer may be provided having a bulk density of the order of 30 to 35 pounds per cubic foot. Such rolls are particularly useful in a sheet drawing machine near the gather where the tmeperatures exceed 1,100°F. and also in a sheet machine lehr where temperatures generally exceed 900° F. throughout.

In another embodiment of this invention, the asbestos or ceramic roll body is coated with a dense, durable metal oxide such as an oxide of chromium, manganese, iron, cobalt, nickel, copper or the like. A coating comprising more than one of these oxides may be effectually used. One particularly useful group of coatings is that comprising mixtures of chromium oxide, iron oxide and cobalt oxide such as described for use as glass coatings in U.S. Pat. No. 3,660,061 of Donley, Rieser and Wagner.

In another embodiment of this invention, particularly useful above the lehr in a sheet drawing machine, the asbestos or ceramic roll body is coated with a dense, durable, heat resistant organic polymer. Useful heat resistant organic polymers are thermosetting resins having ignition and degradation points above about 500° to 600°F. Polyimides are preferred but other organic polymers such as polyoxazolidones, polysulfones, polyphenyl oxides, polyamide-imides, and the like may be used. In a particularly preferred embodiment of this invention the asbestos or ceramic roll body is first surrounded by an elastic material which is then surrounded by the organic polymer. The elastic material may be a rubber and is preferably a silicone rubber which retains its elasticity following prolonged exposure to elevated temperatures on the order of about 1,000°F.

DESCRIPTION OF THE PREFERRED EMBODIMENTS

Figure 1:
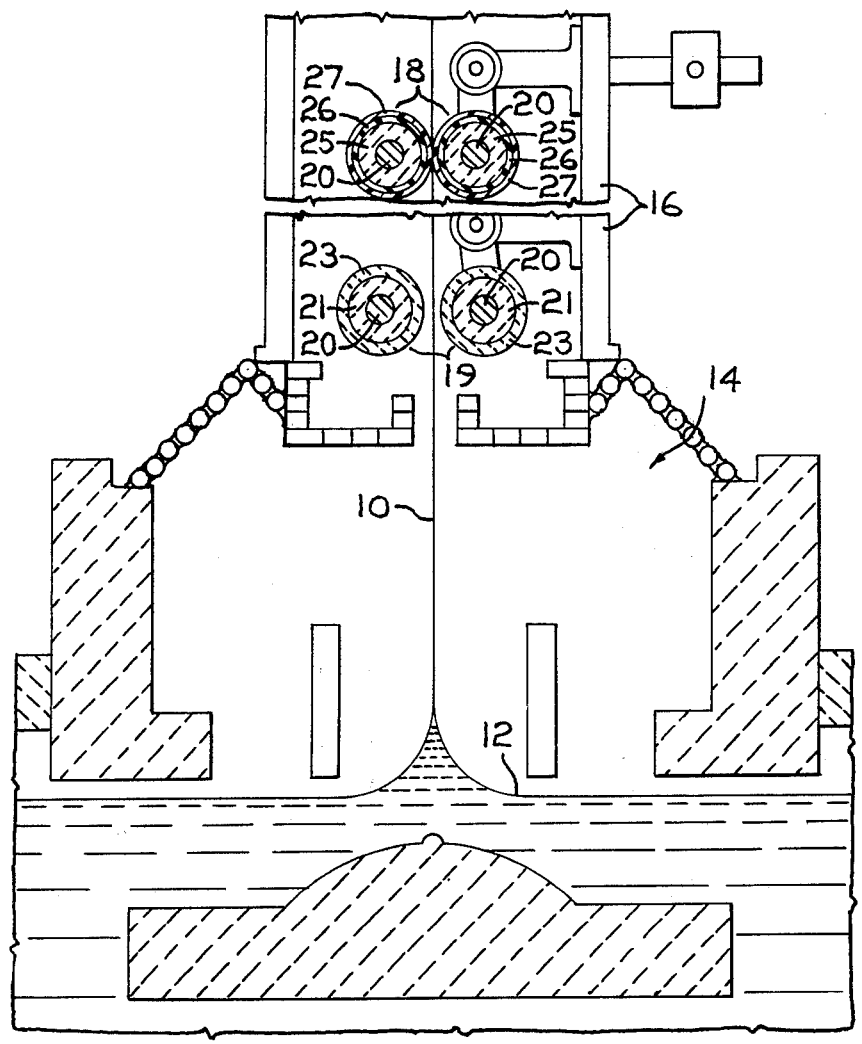
FIG. 1 is a schematic view of a typical Pittsburgh or Pennvernon sheet glass drawing arrangement.

Referring now to the drawings, the present invention may be more fully appreciated in the environment of flat glass manufacture.

In FIG. 1, a ribbon of glass 10 is drawn upwardly from a molten bath 12 through a cooled drawing chamber 14 by means of a drawing machine 16 having pairs of traction rolls 18 which engage the surfaces of the cooled ribbon and pairs of swing rolls 19 which can engage the sheet as it is initially formed but which swing out of engagement after the sheet is satisfactorily being drawn through the machine. The rolls 18 and 19 are usually identical in construction. The cooled drawing chamber 14 comprises a bottom kiln portion in communication with the region just above the molten glass, a lehr portion above that and an upper or conveying and cooling portion extending above (in the Pittsburgh process or beside in the Colburn process thus, above and beside are equivalent in this context) the lehr portion and extending to a cutoff floor or location.

Figure 2:
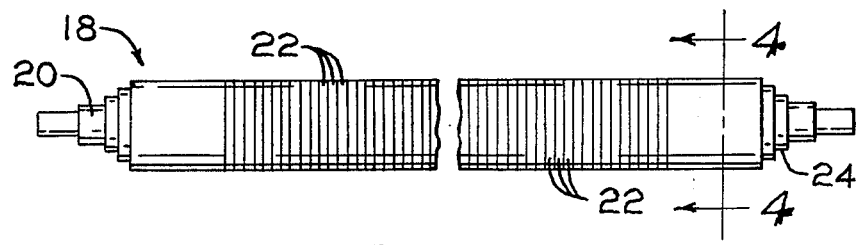
FIG. 2 illustrates a typical traction roll in the FIG. 1 arrangement.

FIG. 2 shows a typical traction roll 18 usable in the drawing machine 16. The roll 18 includes a mandrel 20 (see also FIG. 1) onto which are assembled in side-by-side contacting arrangement a plurality of discs 22 of asbestos-binder composition. The discs generally comprise a plurality of layers of asbestos paper containing a small amount (2 to 10 percent) by weight of a convenient binder such as Portland cement, sodium silicate or the like. End clamps and collars 24 hold the discs under pressure after their assembly.

Figure 3:
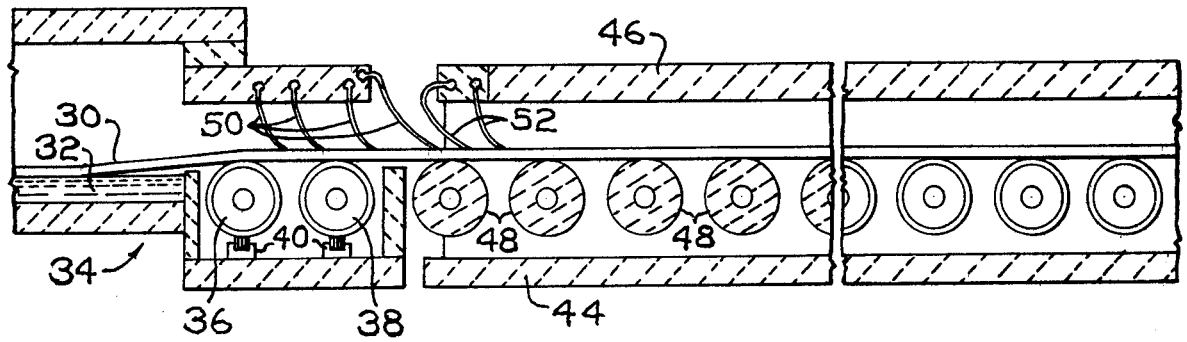
FIG. 3 is a longitudinal section through a typical float glass apparatus showing the take-off rolls and the entry portion of the annealing lehr.

FIG. 3 shows a longitudinal section through a portion of a typical float glass producing arraratus. Here, a ribbon of glass 30 has been treated on a bath 32 of molten liquid, such as molten tin or tin alloy or other metal, contained within a tank 34, and is lifted from the bath at the exit end of the tank by rolls 36 and 38 suitably journaled and driven by means, not shown. Carbon blocks 40 and 42 are spring pressed against the rolls 36 and 38, respectively, so as to remove any materials which become deposited thereon. The blocks 40 and 42 are supported by a tank extension 44 into which removed deposited material will fall for removal.

The glass is conveyed into an annealing lehr 46 having a plurality of lehr rolls 48 therein. Means, not shown, such as a chain drive, are provided for driving the rolls. Each roll exerts a tractive force on the glass of sufficient magnitude to convey the glass through the lehr where its temperature is controlled to release permanent stress and strain in the glass.

A protective reducing atmosphere, such as nitrogen with perhaps a small percentage of hydrogen, is maintained over the bath 32 within the tank 34 in order to protect the bath from oxidization. Generally, the atmosphere contains 90 to 99.9 percent nitrogen and the remainder hydrogen. The atmosphere is maintained at a slight pressure above ambient pressure, as for example, 0.1 to 0.5 inch water, to substantially prevent the ingress of the ambient atmosphere within the tank 34. To retain the atmosphere and to permit the passage of the glass ribbon from the tank 34, the exit end of the tank is provided with a series of curtains or drapes 50 which trail on the glass ribbon. These drapes or curtains are usually made of an asbestos material which will not mar the glass and will withstand the temperature involved, which is approximately 1,000°F. to 1,200°F. at or adjacent the exit end of the tank 34.

Additional drapes or curtains 52 of similar material are provided at the entrance end of the lehr 46. In spite of the precautions taken, i.e., the use of multiple curtains and drapes, gases flow from the tank into the lehr, this condition being called "sting-out" or "carry-over."

Figure 4A:
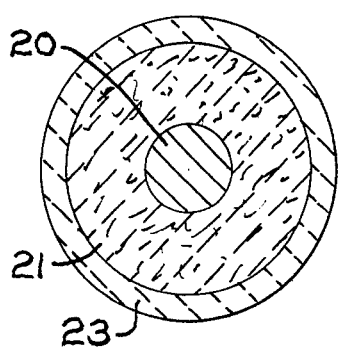
FIG. 4 (a, b and c) shows a cross-sectional view of a roll according to this invention taken along section line 4—4 of FIG. 2. Each figure shows one particularly preferred embodiment of this invention.

The preferred embodiment of this invention shown in FIG. 4a comprises a mandrel 20 having a roll body 21 mounted thereon. The roll body 21 preferably comprises a plurality of asbestos discs 22 as already described. Surrounding the roll body 21 is a sleeve 23 of dense aluminosilicate. This sleeve 23 is more dense than the roll body 21. Together they provide a roll with a hard and dense surface with a softer, less dense and somewhat elastic interior. Thus, the roll can both resist abrasion and puncture.

Figure 4B:
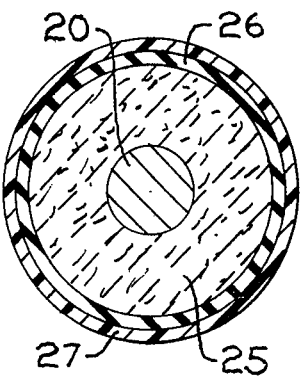

The preferred embodiment of this invention shown in FIG. 4b comprises a mandrel 20 having a roll body 25 mounted thereon. The roll body 25 comprises a plurality of discs 22 already described except that the diameter of the discs (and, thus, the roll body) is generally cut down about 0.05 inch to 0.5 inch and usually about 0.2 inch relative to the diameter of a roll having its roll body exposed. Surrounding the roll body is an optional layer of elastic material 26, preferably silicone rubber, and surrounding that and forming a glass-engaging surface is a layer of heat resistant organic polymer 27, preferably a polyimide.

This embodiment of the present invention has the special advantage of increasing the traction that may be applied by the roll to a glass ribbon or sheet without marking it by increasing the area of contact between the roll and the glass. Due to the elasticity or resiliency of this roll, it may be pressed against the glass eliminating bumps or high spots on the roll, which with a conventional roll prevents full glass-roll contact. Elimination of pressure points decreases the likelihood of the roll marking or dimpling the glass.

Since each of the rolls of this embodiment can grip the glass more effectively than conventional rolls, it is possible to employ fewer rolls and to provide more between roll space for more natural or forced cooling of the glass or to provide space for other glass treatment stations.

The organic polymer is preferably reinforced with a refractory fiber material such as asbestos, mineral fibers or glass fibers. The reinforcing material may be chopped fibers, strands, mat, woven cloth, knit cloth or the like. Woven asbestos cloth is a preferred reinforcing material because of ease of fabrication and thermal stability.

The following example illustrates the fabrication of a roll according to this preferred embodiment.

EXAMPLE

A standard finished asbestos roll is turned on a lathe to cut its diameter by 0.2 inch. Using tapes, 36 inches long and one inch wide, the roll is bias-wrapped. The bias-wrapped assembly comprises a first layer formed from 0.062 inch double side pressure sensitive silicone rubber adhesive tape; and a layer comprising two plies of 0.007 inch polyimide-fiber glass tape (B-stage) and one ply of 0.025 woven asbestos cloth impregnated with polyimide resin (B-stage). The polyimide resin in all three plies is P-100 resin and the fiber glass tape is designated AL-300-7628 tape, all products of Atlantic Laminates, Franklin, New Hampshire.

The assembly is double wrapped in polyester (Mylar) — polyethylene bags and the air from the bags is evacuated to hold the assembly in place. The roll is then treated in an air autoclave at 50 pounds per square inch pressure and at a temperature of 360°F. The pressure and temperature are maintained for two and one-half hours after an initial pressurization and rapid heatup. The autoclave is cooled, and the roll is removed and post cured in a step cycle for from 380°F. to 420°F. for 24 hours.

The cured roll is trimmed and turned on a lathe to insure its roundness and is thin installed in a sheet drawing machine. The service life of the roll is at least that of an asbestos roll, and the surface of the glass produced by the organic polymer surface roll is substantially defect free. Asbestos dusting is eliminated with the roll.

Figure 5:
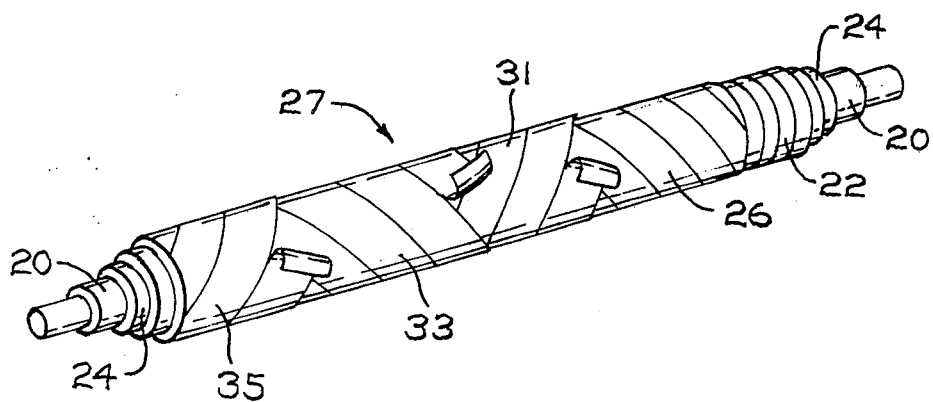
FIG. 5 is a partial perspective view of a roll according to this invention (as shown in FIG. 4b) with layers of roll material partially stripped away to show the roll construction.

The particularly preferred embodiment of this invention that is shown in FIG. 4b and described in the preceding example is further illustrated in FIG. 5. Surrounding a mandrel 20 are a plurality of roll body discs 22 held in place by collars 24. Surrounding the roll body is a layer of elastic material 26 and surrounding that is a built-up layer of organic polymer 27.

The organic polymer layer 27 comprises a plurality of bias-wrapped plies of polymer impregnated tape or cloth 31, 33 and 35. In the preferred embodiment illustrated, there is a first ply of fiber glass cloth reinforced polyimide tape 31, a second ply 33 of similar material wrapped the opposite way and an outer ply of asbestos cloth reinforced polyimide tape 35. All tapes are cured and the outer tape turned to finish the surface.

Figure 4C:
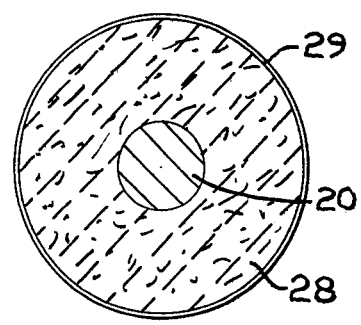

The embodiment of this invention shown in FIG. 4c comprises a mandrel 20 having a roll body 28 mounted thereon. The roll body 28 comprises a plurality of discs 22 already described. Surrounding the roll body 28 is a metal oxide coating. The preferred metal oxide coating is a mixture of the oxides of chrome, iron and cobalt. The metal oxide coating may be formed on conventional asbestos rolls without removing them from service. This is accomplished by spraying the hot rolls iwth a mixture of metal betadiketonates in an organic, non-flammable solvent such as described in U.S. Pat. Nos. 3,081,200 and 3,410,710. The solution described as "8015" in U.S. Pat. No. 3,660,061 is particularly useful to form a durable coating on asbestos rolls operating in a sheet machine. U.S. Pat. No. 3,660,061 is incorporated by reference herein. Oxides of manganese, nickel and copper may also be used.

A special advantage of this embodiment is that existing asbestos rolls may be coated with a non-frangible surface material without taking them out of service. Thus, dusting of the asbestos may be readily eliminated by coating existing rolls to make this embodiment of the present invention.

With all of the embodiments of this invention a proper combination of roll surface hardness and roll body resiliency is provided so that throughout a glass forming or conveying process the glass is gripped without marking. The rolls of this invention maintain their surface hardness and resiliency in use unlike the older asbestos rolls which embrittled its use due to a ceramic phase change, generally to fosterite. As mentioned above, it has been known to direct $SO_2$ gas into sheet drawing machines to degrade the rolls and lubricate each glass-roll interface. This has had an undesirable side effect; sodium sulfate deposits are formed on coolers and structural elements in sheet drawing machines and these deposits occasionally drop into the molten glass causing defects. With the rolls of this invention, such $SO_2$ gas treatment is generally not necessary. However, if it is desired to use the lower temperature organic polymer surface rolls of this invention above the lehr of a sheet drawing machine and asbestos rolls in and below the lehr, sodium sulfate contamination can still be avoided.

In a further embodiment of this invention an alkaline earth metal sulfate, preferably magnesium sulfate, is incorporated in the wet mix used to form the board. During use, this sulfate comes to the surface of the roll as the roll is worn away. This embodiment provides a particular benefit in that the alkaline earth sulfate lubricates the glass-roll interface and prevents marking of the glass, particularly for rolls used in a sheet process. This eliminates the need for sulfur dioxide ($SO_2$) gas addition in the vicinity of asbestos rolls so that sodium sulfate deposits no longer form on coolers and structural elements of the glass-forming apparatus.

In another aspect, this invention comprises a sheet drawing machine having one species of rolls according to this invention in and below a lehr and another species of rolls according to this invention above the lehr. The rolls in the lehr and below the lehr, closest to the gather of molten glass in a sheet drawing kiln each preferably comprises asbestos overlaid with aluminosilicate or asbestos impregnated with magnesium sulfate. The rolls above the lehr each preferably comprises a refractory roll body overlaid with silicone rubber further overlaid with a refractory fiber reinforced layer of polyimide. Such a drawing machine produces glass with little or no surface marking, and sodium sulfate defects are substantially eliminated. Meanwhile, no asbestos particles are dispersed from the machine and the rolls last for extended periods of use.

Although the present invention has been described with reference to the specific details of certain embodiments, it is not intended that such embodiments shall impose a limitation upon the scope of the invention except insofar as included in the accompanying claims.

I claim:

1. A traction roll for engaging glass comprising:
   a mandrel,
   a roll body comprising an asbestos material mounted on said mandrel to provide resiliency to said roll body; and
   a thin layer of a dense, durable material having a density greater than the density of said asbestos material surrounding said roll body, said durable material being selected from the group consisting of aluminosilicate, an oxide of chromium, manganese, iron, cobalt, nickel, copper and mixtures thereof, a silicone rubber and an elastic heat resistant, thermosetting organic polymer having ignition and degradation points above about 500°F., and being selected from the group consisting of polyimides, polyoxazolidones, polysulfones and polyphenyl oxides.

2. The traction roll according to claim 1 wherein said layer of organic polymer is reinforced with refractory fibers.

3. The traction roll according to claim 2 wherein said reinforcing refractory fibers are asbestos fibers.

4. The traction roll according to claim 1, wherein said roll body is surrounded by a layer of an elastic silicone rubber which retains its elasticity on prolonged exposure to temperatures of about 1,000°F. and said elastic rubber layer is surrounded by a layer of an elastic heat resistant thermosetting organic polymer having an ignition and degradation temperature of above about 500°F. selected from the group consisting of polyimides, polyoxazolidones, polysulfones and polyphenyl oxides.

5. The traction roll according to claim 4 wherein said organic polymer is reinforced with asbestos fibers.

6. A traction roll for engaging glass, comprising:
a roll body comprising a refractory material;
a layer of silicone rubber surrounding said roll body;
at least one ply of bias-wrapped, fiber glass cloth reinforced B-stage polyimide tape, heat cured in place about said layer of silicone rubber; and
at least one ply of polyimide impregnated asbestos cloth heat cured in place about said at least one ply of bias-wrapped, fiber glass cloth reinforced B-stage polyimide tape.

7. A traction roll for engaging glass, comprising:
a mandrel; and
a roll body mounted on said mandrel, said roll body made of asbestos impregnated with an alkaline earth metal sulfate.

8. The traction roll according to claim 7 wherein said alkaline earth metal sulfate is magnesium sulfate.

9. In a sheet drawing machine comprising a drawing kiln and thereabove an enclosed cooling chamber comprising a kiln portion, a lehr portion and a conveying and cooling portion, each having traction rolls therein, the improvement comprising, in said kiln portion and in said lehr portion, traction rolls, each comprising an asbestos roll body overlaid with aluminosilicate, and, in said conveying and cooling portion, traction rolls, each comprising a roll body overlaid with an elastic material further overlaid with a heat resistant, thermosetting, organic polymer having an ignition and degradation temperature of above about 500°F. selected from the group consisting of polyimides, polyoxazolidones, polysulfones and polyphenyl oxides.

10. In a sheet drawing machine comprising a drawing kiln and thereabove an enclosed cooling chamber comprising a kiln portion, a lehr portion and a conveying and cooling portion, each having traction rolls therein, the improvement comprising, in said kiln portion and in said lehr portion, traction rolls, each comprising an asbestos roll body impregnated with alkaline earth metal sulfate, and, in said conveying and cooling portion, traction rolls, each comprising a roll body overlaid with an elastic material further overlaid with a heat resistant, thermosetting, organic polymer having an ignition and degradation temperature of above about 500°F. selected from the group consisting of polyimides, polyoxazolidones, polysulfones and polyphenyl oxides.

11. A traction roll for engaging glass, comprising:
a roll body comprising a refractory material;
a first layer of silicone rubber material surrounding said roll body;
a second layer of a B-stage polyimide reinforced fiber glass cloth heat cured in place about said first layer; and
a third layer of a polyimide impregnated asbestos cloth heat cured in place about said second layer.

12. In a sheet drawing machine comprising a drawing kiln and thereabove an enclosed cooling chamber comprising a kiln portion, a lehr portion and a conveying and cooling portion, each having traction rolls therein, the improvement comprising, at least one pair of traction rolls each comprising a roll body comprising a refractory material and having a layer of heat resistant thermosetting organic polymer having an ignition and degradation temperature of above about 500°F. surrounding said roll body, said polymer being selected from the group consisting of polyimides, polyoxazolidones, polysulfones and polyphenyl oxides.

13. The improved sheet drawing machine as set forth in claim 12 wherein said layer includes:
a first layer of silicone rubber material surrounding said roll body;
a second layer of a B-stage polyimide reinforced fiber glass cloth heat cured in place about said first layer; and
a third layer of a polyimide impregnated asbestos cloth heat cured in place about said second layer.

14. The improved sheet drawing machine as set forth in claim 13 wherein said first layer is a layer of silicone rubber; said second layer is at least one ply of bias-wrapped, fiber glass cloth reinforced B-stage polyimide cloth; and said third layer is at least one ply of polyimide impregnated asbestos cloth.

* * * * *